June 10, 1969 S. H. CAMERON ET AL 3,449,516

GRAPHICAL INPUT SYSTEM

Filed Dec. 27, 1965

INVENTORS
SCOTT H. CAMERON
MICHAEL A. LIVERIGHT
BY Hill, Sherman, Meroni, Gross & Simpson
ATTYS.

United States Patent Office 3,449,516

Patented June 10, 1969

3,449,516
GRAPHICAL INPUT SYSTEM

Scott H. Cameron, Northfield, and Michael A. Liveright, Chicago, Ill., assignors to IIT Research Institute, Chicago, Ill., a corporation of Illinois

Filed Dec. 27, 1965, Ser. No. 516,403
Int. Cl. G08b *5/00*
U.S. Cl. 178—18 4 Claims

ABSTRACT OF THE DISCLOSURE

A graphical input system for producing electric signals in accordance with manually determined graphical information comprising a resistive tablet with orthogonal electric fields and a cooperating stylus wherein successive diodes are associated with individual contact terminals along each side of the tablet so as to prevent current flow between adjacent contact terminals at each side as a result of the electric field applied between the adjoining sides.

This invention relates to a graphic input system and particularly to such a system for translating a pointer's position into electric signals uniquely representative of such position. Preferably two voltages are produced proportional to the normal Cartesian coordinates of the pointer, and these voltages may be read by a computer via analog to digital converters. A system in accordance with the present invention has been called "Electro Sketch" and it is possible to use the "Electro Sketch" for on-line input to a computer of such graphical data as handwriting and drawings.

It is an object of the present invention to provide an improved graphical input system of unique simplicity and economy.

It is a more specific object of the invention to provide electric circuitry for producing multiplexed electric field patterns having respective configurations in an electric field region such as to uniquely identify each point in the region, the circuitry serving to provide electric field patterns having improved linearity and/or a greater useful operating area so as to facilitate the accurate conversion of an input position into electric signals representing such position.

Figure 2:
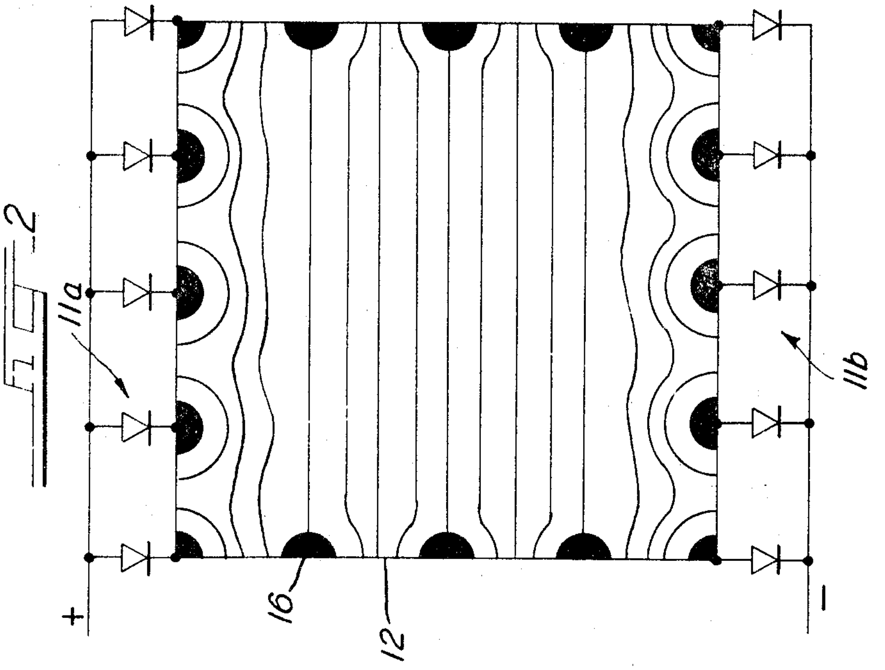
Figure 1:
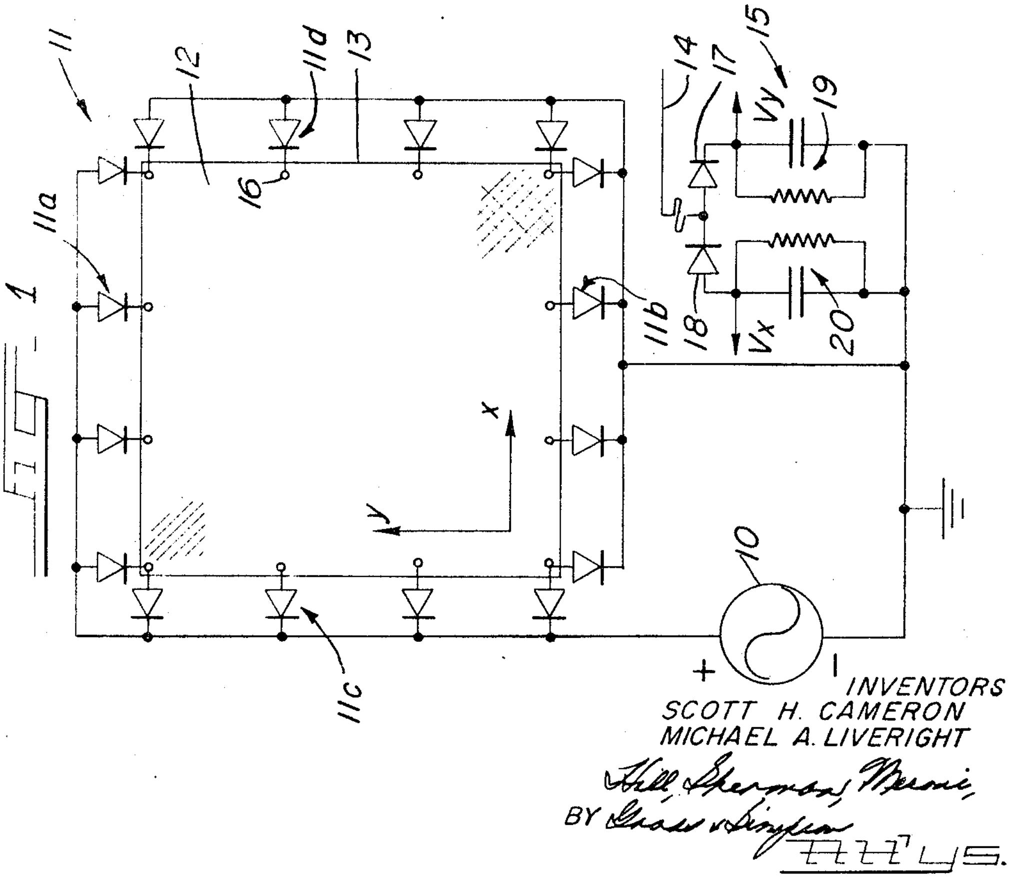

Other objects, together with various features and advantages of the invention will be apparent from the following detailed description taken in connection with the accompanying drawings, in which:

FIG. 1 shows a circuit diagram of a graphical input system in accordance with the present invention; and FIG. 2 shows a field plot for the resistive layer and circuit arrangement of FIG. 1.

In the illustrated embodiment, an alternating voltage source 10 and a passive diode network 11 are used to impress a set of potential fields on a resistive layer 12 of a tablet or nonconductive support 13. A pointer is diagrammatically indicated at 14 and is arranged so as to be manually positionable for contact with any desired point over the region of the resistive layer 12. A detector 15 is used to separate the output from the pointer or stylus 14 into two voltages proportional to the normal Cartesian coordinates of the point on the layer 12 contacted by the pointer.

The source 10 preferably supplies a symmetric alternating voltage. On the positive half-cycle first sets of diodes 11*a* and 11*b* of the network 11 conduct and impress a nearly uniform electric field in the layer 12 that is in the Y direction as indicated in FIG. 1, the equipotential lines of the field being plotted in FIG. 2. During the negative half-cycle second sets of diodes 11*c* and 11*d* of network 11 conduct, impressing a similar field in the X direction.

The number of contact terminals 16 and their area of contact with the resistive layer 12 must be chosen so that a sufficiently uniform field is produced. The actual area of the terminals 16 is represented by the shaded regions in FIG. 2. (The terminals are diagrammatically indicated by small circles in FIG. 1.) The distance between successive contacts 16 on a side of the layer 12 should be small in comparison to the spacing between the sets of contacts or points at opposite sides of the layer. Obviously, increasing the number of terminals 16 and/or the contact area of the terminals tends to increase the uniformity of the field when the diodes associated therewith are conducting, whereas such an increase of number or size of terminals tends to distort the field when the terminals are inactive. As may be seen from FIG. 2, with the use of the preferred arrangement the field is almost uniform except at the edges, and thus the position of the pointer 14 in the Y direction can be accurately determined from the voltage at the point on the layer 12 that the pointer touches. The field produced in the X direction is, of course, entirely similar in the illustrated embodiment.

Thus the field on the layer 12 is alternating between one capable of representing the horizontal (X) coordinate of pointer position and one representing the vertical (Y) coordinate of pointer position. The detector 15 is used to separate the signal amplitudes relating to the respective coordinate directions and to filter out magnitude variations. The separation is done by output circuits respectively consisting essentially of passive diode 17 and of passive diode 18. Diode 17 transmits the Y field information and blocks the X field information, while diode 18 transmits the X field information and blocks the Y field information. Filters 19 and 20 detect the peak positive and negative voltages, respectively, and hold them. Thus both components are available simultaneously. The output voltages designated $V_x$ and $V_y$ may be input to analog to digital converters, and thus the computer can read the position of a pointer over the region of resistive layer 12.

By way of example and not of limitation, a successful embodiment of the present invention had the following particulars. A uniform resistive layer was produced on a Masonite board by spraying a dry graphite film lubricant in two or three layers. Such a resistive material known as "DGF" may be obtained from Miracle Product Corp., Cleveland, Ohio. All of the diodes utilized in such embodiment were of the computer type identified as HD–2261. The capacitors used in the detector 15 each had a value of .2 microfarad while the resistors each had a value of 1 megohm. The resistive layer was 6 inches square with 6 uniformly spaced terminals or points of configuration essentially as illustrated in FIG. 2, the successive terminals having a spacing of 1.2 inch center to center. The source utilized operated at a frequency of 20 kilocycles per second and supplied a voltage alternating between −3 volts and +3 volts peak to peak.

It may be noted that the electric field means of the present invention is not limited to a solid resistive layer, since the electric field region may be provided by an electrolyte in a suitable rectilinear container, for example. A pantograph arrangement may be utilized so that the stylus to be manipulated is external to the electric field region but linked to an electric field sensitive element within the electrolyte. Such an arrangement could be extended to three dimensional space, by suitable multiplexing in the time or frequency domain, for example, or by utilizing one container of electrolyte for the X and Y coordinates as illustrated in FIGS. 1 and 2, and by utilizing a further linkage in cooperation with a further container of electrolyte for separately sensing the Z coordinate. Arrangements to simulate other coordinate systems will readily occur to those skilled in the art from a study of the present disclosure.

As specifically applied to the illustrated embodiment an important aspect of the invention resides in the concept of isolating the momentarily inactive contact terminals of the resistive layer or electric field means 12 from each other during each half cycle of the source 10. Thus having reference to the orientation of the parts as shown in FIG. 1, for the half cycle where the upper terminal of source 10 is positive, the diodes 11*c* isolate the terminals 16 at the left side of resistive layer 12 from each other, and the diodes 11*d* isolate the terminals at the right side from each other. A similar isolation is provided by diodes 11*a* and 11*b* during the opposite half cycle of source 10.

In its broadest aspects, the present invention comprehends controlled switch means as well as diodes for electrically isolating the individual terminals providing one of the respective multiplexed field patterns with respect to an applied potential producing a second of the field patterns to minimize the distortion of the second electric field pattern. The use of passive voltage-responsive unidirectionally conductive devices such as diodes is preferred, however, since such devices provide a uniquely simple and economical configuration.

It will be apparent that modifications and variations may be effected without departing from the scope of the novel concepts of the present invention.

We claim as our invention:

1. In a graphical input system including electric field means having an electric field region capable of providing multiplexed electric fields with respective electric field gradients in said region representing respective coordinates in a predetermined coordinate system so that each position of said electric field region is identified by the values of the respective electric fields at such position, and said electric field means having at least one series of contact terminals for receiving in common a first exciting electric potential relative to another part of said electric field region to produce one of said electric fields, means for supplying said first exciting electric potential to each of said series of contact terminals to produce said one of said multiplexed electric fields, means for applying a second exciting electric potential to said electric field means to provide a second one of said multiplexed electric fields, means for electrically isolating the individual contact terminals of said series from each other with respect to current flow between such terminals via said supplying means as a result of said second exciting electric potential, thereby to avoid the distortion of the second one of said multiplexed electric fields which would result from such current flow, and sensing means movable over said electric field region so as to represent graphical input information and responsive to the values of the respective electric fields at each position thereof to generate respective output signals representing such position, said electrically isolating means comprising means preventing current flow between the individual contact terminals of said series via said supplying means as a result of said second exciting electric potential.

2. The graphical input system of claim 1 with said electric field means having four series of contact terminals arranged to define a generally rectilinear electric field region, the electric fields being substantially orthogonally related, and the electrically isolating means comprising diodes connected between said supplying means and each of said contact terminals of each of said series.

3. The graphical input system of claim 2 with said supplying means supplying an alternating current potential, with said diodes being poled to apply said first exciting potential during one half cycle of said supplying means and to apply said second exciting potential during the other half cycle of said supplying means, and with respective peak detectors connected to said sensing means and responding to the respective output signals therefrom in each cycle of the supplying means.

4. A graphical input system for producing electric signals in accordance with manually determined graphical information, comprising electric field means for providing electric field gradients in respective first and second directions in a region in response to the application of an exciting potential between first sets of points spaced apart in the first direction and between second sets of points spaced apart in the second direction, respectively, a source of alternating electric exciting potential for energizing said electric field means, first and second sets of input diodes of respective opposite polarities interposed between said source and the first and second sets of points, respectively, for supplying alternately electric pulses of one polarity from said source of the first sets of points and electric pulses of the opposite polarity from said source to the second sets of points, sensing means manually movable about said region and responsive to the electric fields alternately provided by said electric field means and having an output line for supplying alternately first output pulses of one polarity in response to excitation of the first sets of points and second output pulses of opposite polarity in response to excitation of the second sets of points, a first output circuit consisting essentially of first passive diode means of one polarity connected directly to the output line of said sensing means for transmitting said first output pulses of said one polarity while blocking said second output pulses of said opposite polarity, and a second output circuit consisting essentially of second passive diode means of opposite polarity connected directly to the output line of said sensing means in parallel with said first passive diode means for transmitting said second output pulses of said opposite polarity while blocking said first output pulses of said one polarity.

References Cited

UNITED STATES PATENTS

| | | | |
|---|---|---|---|
| 2,900,446 | 8/1959 | McLaughlin et al. | 178—18 |
| 3,032,609 | 5/1962 | Fluhr et al. | 178—18 |

THOMAS A. ROBINSON, *Primary Examiner*.

U.S. Cl. X.R.

178—19